US008925039B2

(12) United States Patent
Morovitz et al.

(10) Patent No.: US 8,925,039 B2
(45) Date of Patent: Dec. 30, 2014

(54) SYSTEM AND METHOD OF SELECTIVELY APPLYING SECURITY MEASURES TO DATA SERVICES

(75) Inventors: Jennifer Morovitz, Ballwin, MO (US); Gustavo de los Reyes, Fair Haven, NJ (US); Sanjay Macwan, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 119 days.

(21) Appl. No.: 12/636,962

(22) Filed: Dec. 14, 2009

(65) Prior Publication Data

US 2011/0145887 A1  Jun. 16, 2011

(51) Int. Cl.
- *G06F 17/30* (2006.01)
- *H04N 21/454* (2011.01)
- *H04N 21/44* (2011.01)

(52) U.S. Cl.
CPC ..... *H04N 21/4542* (2013.01); *H04N 21/44008* (2013.01)
USPC ....................................... 726/3; 726/1; 726/2

(58) Field of Classification Search
CPC .................... H04N 21/4552; H04N 21/44008; H04L 63/08; H04L 63/10; H04L 63/20; H04L 29/06; H04L 63/0428
USPC ..................................................... 726/3, 1–2
See application file for complete search history.

(56) References Cited

U.S. PATENT DOCUMENTS

| | | | |
|---|---|---|---|
| 5,954,798 A * | 9/1999 | Shelton et al. ................ 709/224 |
| 6,014,746 A * | 1/2000 | Krehnke et al. ................ 726/22 |
| 6,356,941 B1 * | 3/2002 | Cohen .......................... 709/219 |
| 6,535,227 B1 * | 3/2003 | Fox et al. ...................... 715/736 |
| 6,615,358 B1 * | 9/2003 | Dowd et al. .................... 726/14 |
| 6,618,858 B1 * | 9/2003 | Gautier ......................... 725/132 |
| 6,976,163 B1 * | 12/2005 | Hind et al. .................... 713/156 |
| 7,194,766 B2 * | 3/2007 | Noehring et al. ............... 726/13 |
| 7,463,637 B2 * | 12/2008 | Bou-Diab et al. ........... 370/401 |
| 7,500,104 B2 * | 3/2009 | Goland .......................... 713/175 |
| 7,596,227 B2 | 9/2009 | Illowsky et al. |
| 7,624,436 B2 * | 11/2009 | Balakrishnan et al. ......... 726/13 |
| 7,757,283 B2 * | 7/2010 | Robert et al. ................... 726/22 |
| 7,908,647 B1 * | 3/2011 | Polis et al. ........................ 726/5 |
| 8,156,183 B2 * | 4/2012 | Polis et al. .................... 709/203 |
| 8,238,559 B2 * | 8/2012 | Casey et al. ................... 380/279 |
| 8,266,694 B1 * | 9/2012 | Roy ............................... 726/22 |
| 8,387,138 B2 * | 2/2013 | Howcroft et al. ............... 726/22 |
| 8,468,558 B2 * | 6/2013 | Grevers, Jr. ................... 725/14 |
| 8,520,850 B2 * | 8/2013 | Helms et al. .................. 380/239 |
| 2001/0026591 A1 * | 10/2001 | Keren et al. ............. 375/240.26 |
| 2002/0035404 A1 * | 3/2002 | Ficco et al. ..................... 700/65 |
| 2002/0124187 A1 * | 9/2002 | Lyle et al. .................... 713/201 |
| 2002/0188839 A1 * | 12/2002 | Noehring et al. ............. 713/153 |

(Continued)

OTHER PUBLICATIONS

David Banks et al, Breaking Open the Set Top Box, Nov. 1997.*

(Continued)

*Primary Examiner* — Andy Rao
*Assistant Examiner* — Shan Elahi
(74) *Attorney, Agent, or Firm* — Toler Law Group, PC (57) ABSTRACT

Systems and methods of applying security measures to data services are disclosed. In one embodiment, a processor determines when more than one data service is used by or is accessible to a subscriber device and applies a security measure to at least one data service.

21 Claims, 7 Drawing Sheets

(56) References Cited

U.S. PATENT DOCUMENTS

| | | | |
|---|---|---|---|
| 2004/0030705 A1* | 2/2004 | Bowman-Amuah | 707/100 |
| 2004/0205360 A1* | 10/2004 | Norton et al. | 713/201 |
| 2004/0215972 A1* | 10/2004 | Sung et al. | 713/201 |
| 2004/0250273 A1* | 12/2004 | Swix et al. | 725/25 |
| 2005/0022010 A1* | 1/2005 | Swander et al. | 713/201 |
| 2005/0066197 A1* | 3/2005 | Hirata et al. | 713/201 |
| 2005/0153682 A1* | 7/2005 | Minear et al. | 455/405 |
| 2005/0179531 A1* | 8/2005 | Tabe | 340/447 |
| 2005/0235352 A1* | 10/2005 | Staats et al. | 726/14 |
| 2005/0286466 A1* | 12/2005 | Tagg et al. | 370/329 |
| 2006/0136722 A1* | 6/2006 | Ogura et al. | 713/168 |
| 2006/0233166 A1* | 10/2006 | Bou-Diab et al. | 370/389 |
| 2006/0272019 A1* | 11/2006 | Addepalli | 726/23 |
| 2006/0274764 A1* | 12/2006 | Mah et al. | 370/401 |
| 2007/0061393 A1* | 3/2007 | Moore | 709/201 |
| 2007/0142033 A1* | 6/2007 | Deas et al. | 455/411 |
| 2007/0157249 A1* | 7/2007 | Cordray et al. | 725/58 |
| 2007/0192863 A1* | 8/2007 | Kapoor et al. | 726/23 |
| 2007/0226775 A1* | 9/2007 | Andreasen et al. | 726/1 |
| 2007/0240232 A1* | 10/2007 | Pino et al. | 726/28 |
| 2007/0294737 A1* | 12/2007 | Edwards et al. | 725/112 |
| 2008/0046349 A1* | 2/2008 | Elberg et al. | 705/35 |
| 2008/0059635 A1* | 3/2008 | Seiferth et al. | 709/226 |
| 2008/0134330 A1* | 6/2008 | Kapoor et al. | 726/22 |
| 2008/0147737 A1* | 6/2008 | Glasgow et al. | 707/104.1 |
| 2008/0148342 A1* | 6/2008 | Aiyagari et al. | 726/1 |
| 2008/0163355 A1* | 7/2008 | Chu | 726/12 |
| 2008/0189460 A1* | 8/2008 | Armstrong et al. | 710/200 |
| 2008/0196102 A1* | 8/2008 | Roesch | 726/23 |
| 2008/0229415 A1* | 9/2008 | Kapoor et al. | 726/22 |
| 2009/0055915 A1* | 2/2009 | Piliouras | 726/8 |
| 2009/0060028 A1* | 3/2009 | Liu et al. | 375/240.01 |
| 2009/0110085 A1* | 4/2009 | Kennedy et al. | 375/257 |
| 2009/0147779 A1* | 6/2009 | Foti | 370/389 |
| 2009/0160662 A1* | 6/2009 | Shamilian | 340/636.1 |
| 2010/0138895 A1* | 6/2010 | Bouchat et al. | 726/1 |
| 2011/0145887 A1 | 6/2011 | Morovitz | |

OTHER PUBLICATIONS dsgwp_wp, DOCSIS Set-Top Gateway, 1992-2004.*
Focus group on iptv, Desirable feature of IPTV system, Jul. 2006.*

* cited by examiner

DETECTION OF USAGE

402

SILO USAGE
- TELEVISION DATA TO A TV
- TELEPHONE DATA TO A TELEPHONE
- INTERNET DATA TO A COMPUTER

404

NON-SILO USAGE
- TELEVISION DATA TO A COMPUTER OR TELEPHONE
- TELEPHONE DATA TO A COMPUTER OR TELEVISION
- INTERNET DATA TO A TELEVISION OR TELEPHONE

SYSTEM AND METHOD OF SELECTIVELY APPLYING SECURITY MEASURES TO DATA SERVICES

FIELD OF THE DISCLOSURE

The present disclosure is generally related to selectively applying security measures to data services.

BACKGROUND

Many homes and businesses receive Internet data from the Internet via a cable network, a telephone network, or a wireless network. These dwellings may also receive television data from a television network, such as a cable television network, a broadcast television network, an Internet Protocol Television (IPTV) network, or a satellite network. The dwellings may also receive telephone data from a telephone network or from the Internet. Alternatively, the dwellings may receive television data, telephone data, and Internet data from a single service provider. In some systems, the television data, the telephone data, and the Internet data may be provided by a fiber optic cable that feeds existing telephone lines that are wired into the dwellings. For example, a supplier of television, telephone, and Internet data may provide a broadband signal carrying the data into a neighborhood of dwellings. Within a dwelling, the broadband signal can be routed to a television, a telephone, a computer, or other device. In some households, a modem, a residential gateway, a set top box, or other customer premises equipment (CPE) may receive the broadband signal and route the television data, the telephone data, and the Internet data to one or more devices. The television data is typically routed to a television. The telephone data is typically routed to a telephone. The Internet data is typically routed to a computer.

Increasingly, many subscribers use more than one data service on a device. For example, a television may display content from a television network and from the Internet. A telephone may receive audio data from a telephone network and Internet data from the Internet or television data from a telephone network. A computer may receive and display content from the Internet and from a television network. When more than one data service is used by a subscriber device, there is an increased risk that a fault in one data service can disrupt the rendering of data of another data service. For example, when a television renders both television data and Internet data, there is a risk that a virus in the Internet data may cause a fault in the operation of a set top box to which the television data and the Internet data are routed. A fault in the operation of the set top box may, in turn, cause a fault in the rendering of the television data.

DETAILED DESCRIPTION

A computing device of a data service provider is disclosed that includes a memory and a processor. The memory is to store computer instructions and usage profile data concerning usage of data services provided by the service provider to a subscriber device. The processor executes the computer instructions to determine usage of one or more data services by the subscriber device, and to selectively apply a security measure when a subscriber device usage profile indicates usage of more than one data service by the subscriber device.

A processor-readable medium embodying processor-readable instructions is also disclosed. The processor-readable instructions include instructions that, when executed by a processor of a data service provider computer, cause the processor to determine when more than one data service is used by a subscriber device and to apply a security measure to at least one data service when more than one data service is used by the subscriber device.

A computer-implemented method is also disclosed. The computer-implemented method includes detecting, at a data service provider computing device, usage data indicating usage of one or more data services provided by the data service provider to a remote subscriber device. In some embodiments, a data service is one of a television data service, a telephone data service, and an Internet data service. The computer-implemented method also includes selectively applying a security measure to one or more data services at the data service provider computing device when the usage data indicates use of multiple data services at the subscriber device.

Figure 1:
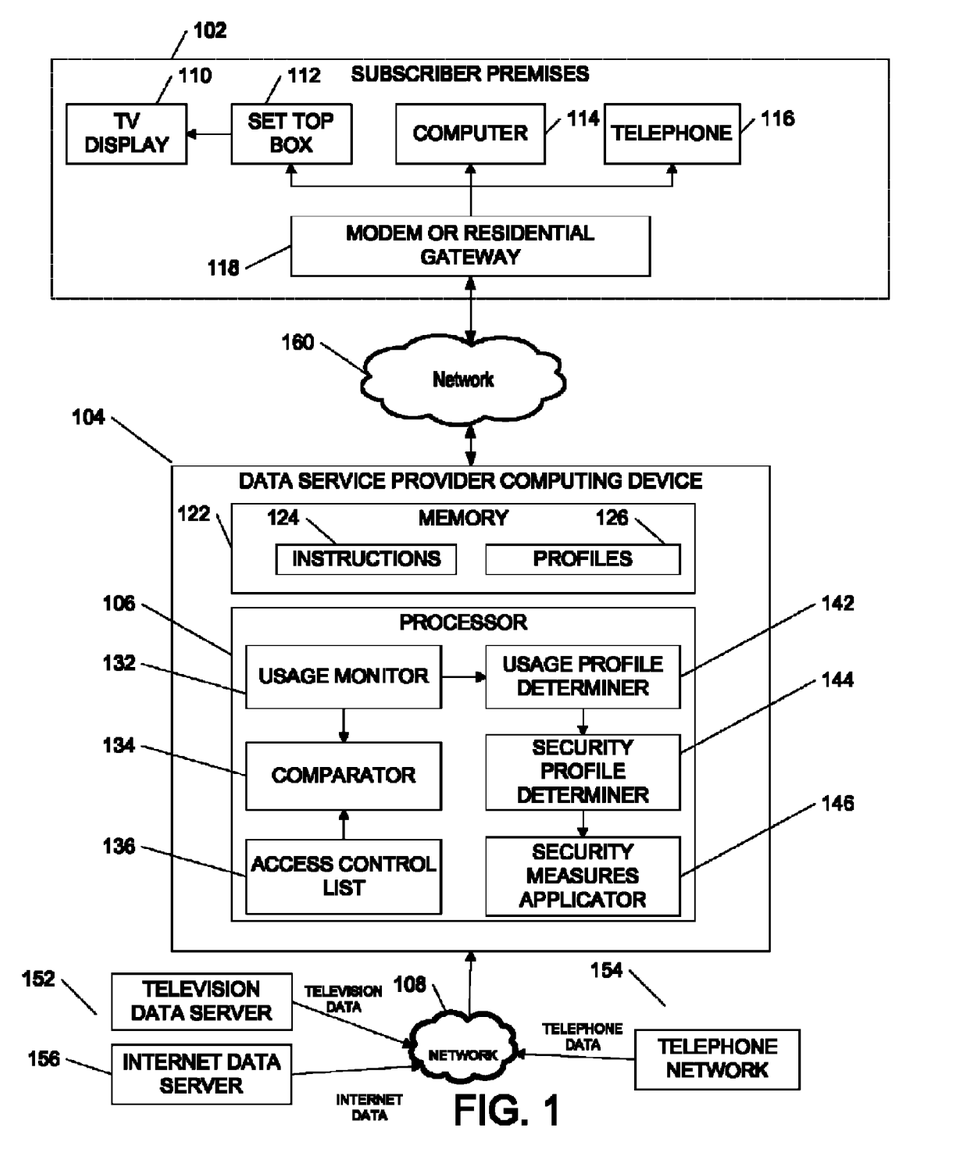
FIG. 1 is a block diagram of an embodiment of a system to apply security measures to television, telephone, and Internet data.

FIG. 1 is a block diagram of an embodiment of a system to apply security measures to data services, such as television, telephone, and Internet data services. In the embodiment of FIG. 1, a data service provider computing device 104 delivers television data, telephone data, and Internet data to a subscriber premise 102. The television data may be received by the data service provider computing device 104 from a television data server 152 via a network 108. The telephone data may be received by the data service provider computing device 104 from a telephone network 154 via the network 108. The Internet data may be received by the data service provider computing device 104 from an Internet data server 156 via the network 108.

The television data, telephone data, and Internet data of the data services may be delivered to a modem or residential gateway 118 of the subscriber premises 102 via a network 160. For example, the network 160 may include a fiber optic cable that carries the data services to a residential neighborhood where the data services are carried from the fiber optic cable into homes of the neighborhood via Plain Old Telephone Service (POTS) telephone lines or via coaxial cables. Alternatively, fiber lines may be provided directly to each destination. The modem or residential gateway 118 may distribute the data of the data services to a television display 110 via a set top box 112, to a computer 115, and to a telephone 116. In alternative configurations, data may be distributed to the computer 115 and to the telephone 116 via the set top box 112.

The data service provider computing device 104 includes a memory 122 and a processor 106. The memory 122 may store computer instructions 124 and usage profiles and security profiles 126. Usage profiles include information concerning usage of various data services including television data service, telephone data service, and Internet data service. For example, a usage profile 126 may indicate that a subscriber television uses television data and Internet data received from the data service provider computing device 104. Security profiles include information concerning security measures applied to each data service provided by the data service provider computing device 104.

The processor 106 performs various functions relating to the selective application of security measures to the data services provided by the data service provider computing device 104. For example, the processor 106 may implement a usage monitor 132 to monitor usage of data services by a subscriber device. By monitoring usage of a subscriber device, the processor 106 may determine a usage profile for the subscriber device via a usage profile determiner 142. In some embodiments, a usage profile is determined by monitoring usage of data services by a subscriber device. Alternatively, a usage profile may be determined in advance by querying a subscriber concerning usage of data services by the devices of the subscriber. A security profile determiner 144 may determine a security profile for a subscriber device based on the usage profile determined by the usage profile determiner 142. For example, in case the usage profile indicates usage by a subscriber set top box of both television data of a television data service and Internet data of an Internet data service, the security profile determiner 144 may determine a particular security measure to be applied to the television data, the Internet data, or both the television data and the Internet data.

The processor 106 may also compare usage by a subscriber device to an access control list 136 via a comparator 134. For example, the comparator 134 may compare an accessed Internet site to the access control list 136. If the accessed Internet site is in the access control list 136, the processor 106 may block access to the Internet site. In some embodiments, the processor 106 may block access if an accessed site is not in the access control list 136. Examples of the control list 136 is a white list or a black list of websites.

The processor 106 also implements a security measures applicator 146 to selectively apply a security measure to one or more data services based on a security profile determined by the security profile determiner 144. For example, a security profile determined by the security profile determiner 144 may indicate the application of one of a plurality of security measures to a data service. For instance, when the usage monitor 132 determines that the subscriber telephone 116 uses a telephone data service and an Internet data service, this dual usage may be recorded in a usage profile for the subscriber telephone 116. A security profile is determined based on the usage profile. The security profile may indicate, for example, that a security measure is applied to the telephone data that would not otherwise be applied if the subscriber telephone used only telephone data. Security measures that may be applied by the security measures applicator 146 include: comparing an accessed site or source to a list of prohibited sites or sources, or to a list of allowed sites or sources, and blocking access to the prohibited sites or sources; performing a deep packet inspection of data delivered to a subscriber device; performing an intrusion protection procedure; increasing data screening; applying parental controls; or other security measures. Thus, additional security measures may be selectively applied to provide increased security for a subscriber device that accesses multiple services (e.g., telephone and internet). In addition, an additional security measure may be applied when a subscriber device accesses data that includes content that is not controlled by the data service provider (e.g., third party content).

Figure 2:
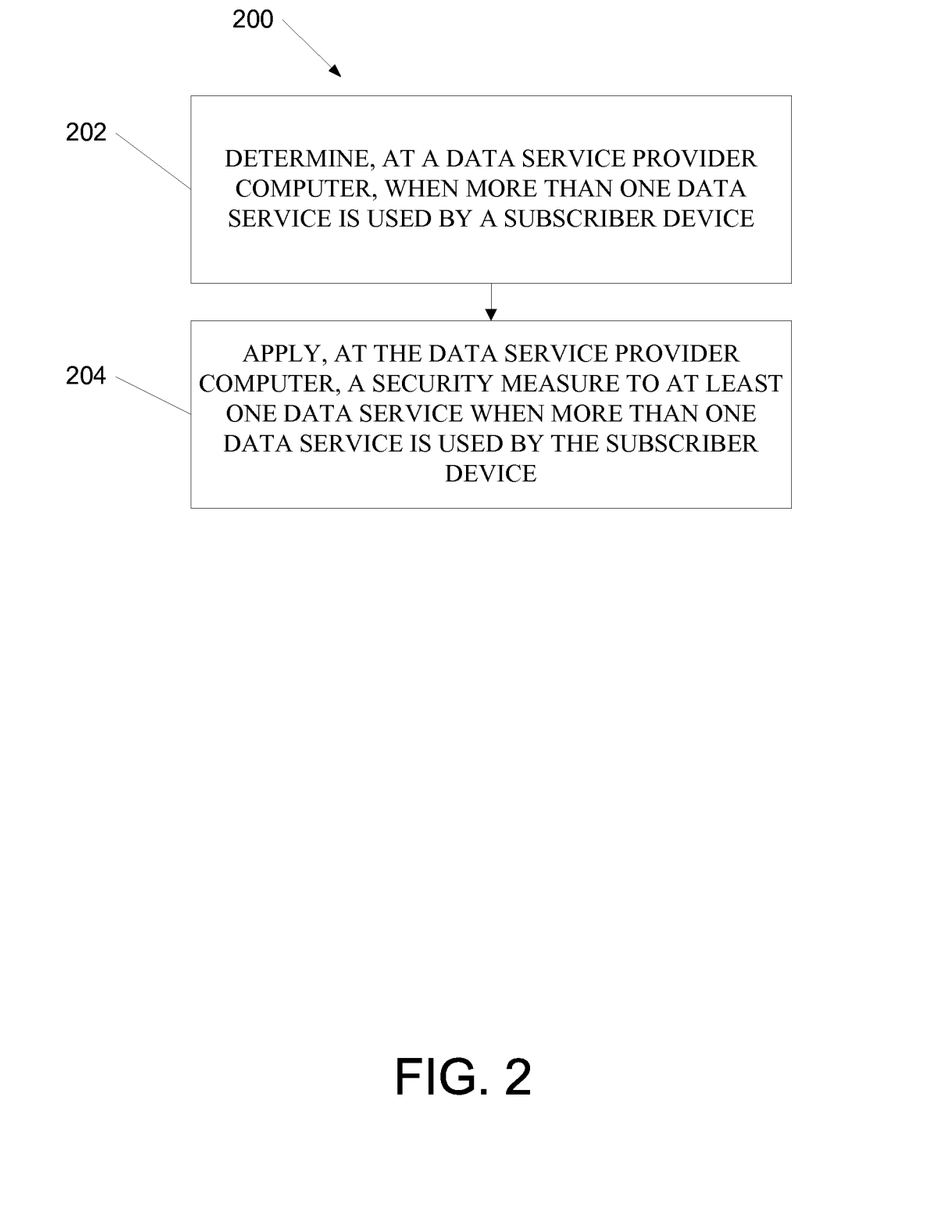
FIG. 2 is a flow diagram of a first embodiment of a method of applying security measures to television, telephone, and Internet data.

FIG. 2 is a flow diagram 200 of a first embodiment of a method of applying security measures to services, such as services that provide television, telephone, and Internet data. In one illustrative embodiment, a data service provider computer determines when more than one data service is used by a subscriber device, at 202. This determination may be made by monitoring actual usage of the data services by the subscriber device or may be based on a previously-determined usage profile of the subscriber device. The previously-determined usage profile may be based on services subscribed to by a subscriber. In response to determining that more than one data service is used or may be used by a subscriber device, the data service provider computer may apply a security measure to at least one data service used by the subscriber device, at 204. For example, a set top box that uses television and internet services may be monitored and added security measures may be applied.

Figure 3:
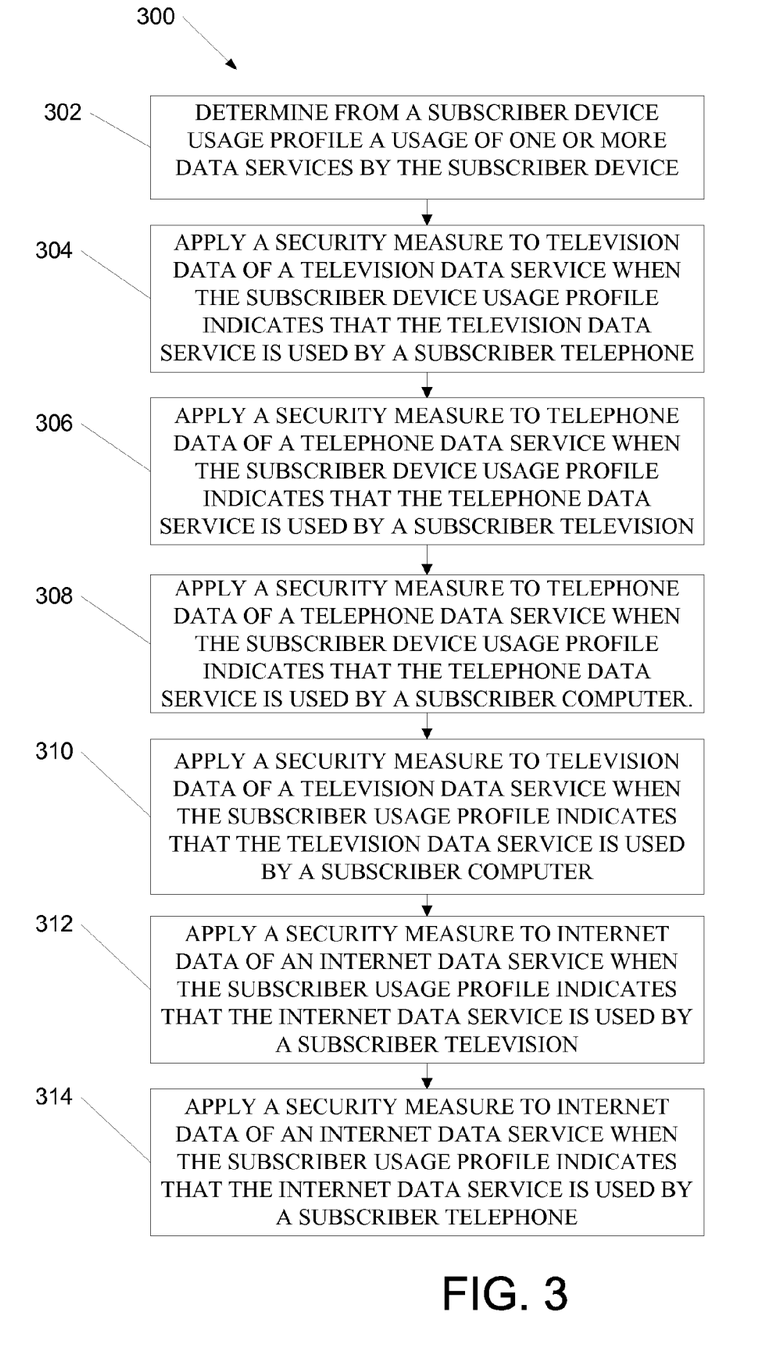
FIG. 3 is a flow diagram of a second embodiment of a method of applying security measures to television, telephone, and Internet data.

FIG. 3 is a flow diagram 300 of a second embodiment of a method of applying security measures to services, that provide television, telephone, and Internet data. A subscriber device usage profile is examined to determine a usage of one or more data services by a subscriber device, at 302. When the subscriber device usage profile indicates that television data service is used by a subscriber telephone, a security measure is applied to television data of the television data service, at 304. When the subscriber device usage profile indicates that a telephone data service is used by a subscriber television, a security measure is applied to telephone data of the telephone data service, at 306. When the subscriber device usage profile indicates that a telephone data service is used by a subscriber computer, a security measure is applied to telephone data of the telephone data service, at 308. When the subscriber device usage profile indicates that a television data service is used by a subscriber computer, a security measure is applied to television data of the television data service, at 310. When the subscriber device usage profile indicates that Internet data service is used by a subscriber television, a security measure is applied to Internet data of the Internet data service, at 312. When the subscriber device usage profile indicates that Internet data service is used by a subscriber telephone, a security measure is applied to Internet data of the Internet data service, at 314. In each case, security measures are selectively applied to devices that have access to multiple types of data services.

In some illustrative embodiments, security measures may be applied to more than one data service in response to determining that a subscriber device uses more than one data service. For example, in response to determining that a subscriber telephone uses both telephone data and television data, the data service provider computer may apply a first security measure to the telephone data and apply a second security measure to the television data. The security measure applied to the telephone data may include, for example, blocking telephone data from one or more particular telephones, whereas the security measure applied to the television data may include, for example, screening frames of video data of the television data. As another example, in response to determining that a subscriber computer uses Internet data, television data, and telephone data, the data service provider computer may apply a different security measure to each of the Internet data, the television data, and the telephone data.

In some illustrative embodiments, a security measure applied to a data service in response to detection of use of multiple services by a subscriber device may be in addition to a security measure already applied to the data service. For example, Internet data may be screened by an anti-virus screening application executed by the processor 106 of FIG. 1. In response, to detecting that Internet data is used by a television 110 at the subscriber premises 102, the data service provider computing device 104 may apply a security measure that is in addition to the anti-virus screening application. For example, in addition to anti-virus screening, a security measured to be applied to the Internet data may include deep packet inspection, or filtering of spyware or malware.

Figure 4:
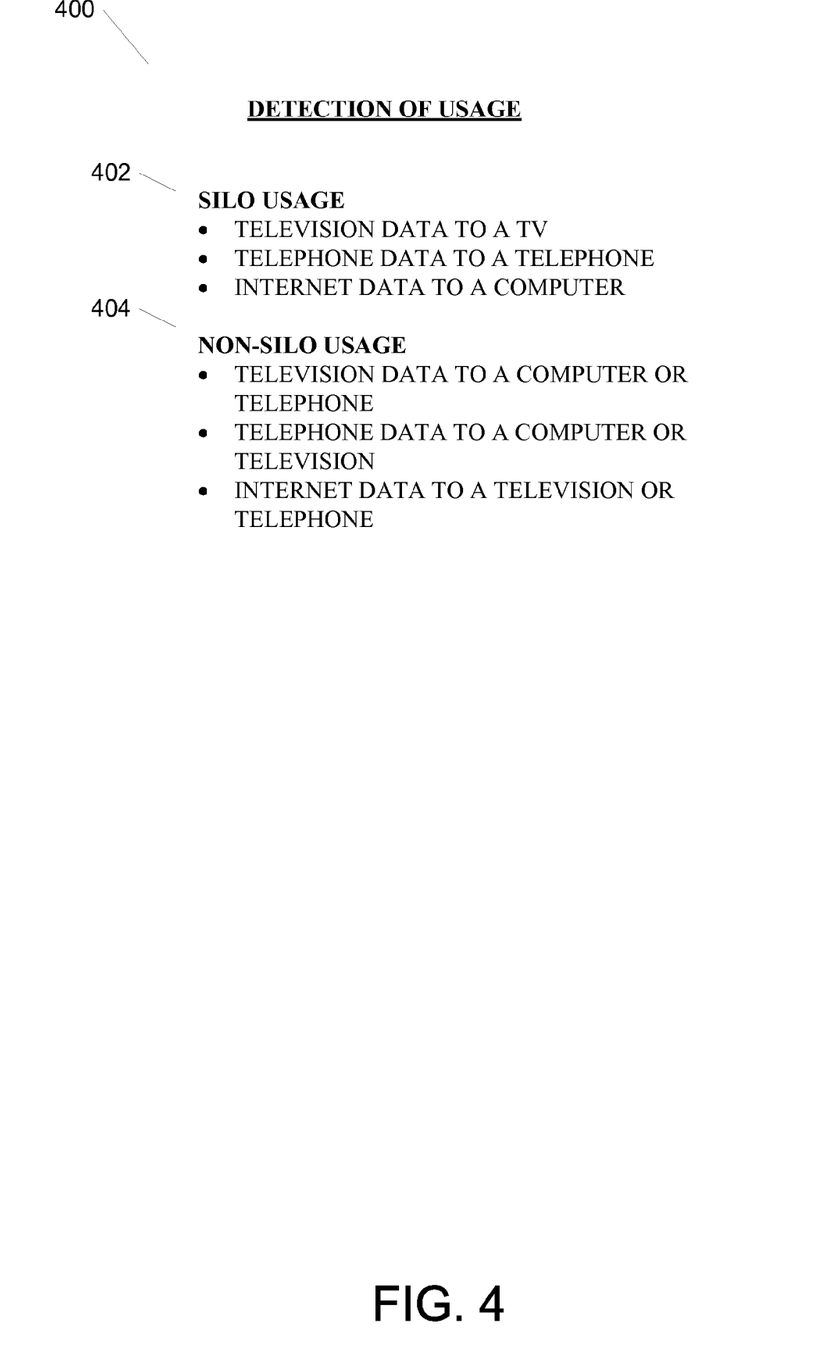
FIG. 4 depicts a table of silo usage and non-silo usage of data services.

FIG. 4 depicts a table 400 of silo usage 402 and non-silo usage 404 of data services. Silo usage is usage of a particular data service on a subscriber device designed primarily for use of the particular data service. For example, a television is designed to display television data. Television data is ordinarily provided via a television network source such as a cable network head end or an internet protocol television (IPTV) system. Television data may include scheduled programs and video on demand programs, as well as electronic program guide data. In one embodiment, when only television data is used by a television, a data service provider computing device may not apply an additional security measure to the television data. When a data service in addition to the television data service is used by the television, an additional security measure may be applied to the television data and or to the data of the additional data service used by the television.

As another example, a telephone is designed to use telephone data. Telephone data is ordinarily provided by a telephone via a telephone network such as the Public Switched Telephone Network (PSTN) or a wide area network such as the Internet (e.g., voice over internet protocol (VoIP) telephone calls). Telephone data may include voice data and facsimile data. In some telephone systems, Internet data may be communicated via the telephone network to a subscriber telephone. Therefore, in some embodiments, telephone data may include Internet data. When data from a telephone network is used by a telephone, then an additional security measure is not applied, in some embodiments. When a data service other than a telephone data service is used at the telephone, an additional security measure may be applied to the telephone data and or to the data of the additional data service used by the telephone.

As another example, a computer is designed to execute applications and to display Internet content based on Internet data received from a communications network. The communications network that carries Internet data. The sources of Internet data include servers that host websites. Servers may provide databases to store Internet data to be transmitted over the communications network that carries the Internet data to end computers. For example, as shown in FIG. 1, Internet data from an Internet data server 156 is provided by way of a first communications network 108 to a data service provider computing device 104. The data service provider computing device 104 sends the Internet data to a modem or residential gateway 118 via a second communications network 160 (which may be the same as the first communications network). The Internet data is sent from the modem or residential gateway 118 to the computer 114. In one embodiment, when only Internet data is used by the computer 114, the data service provider computing device 104 may not apply an additional security measure to the Internet data. When a data service in addition to the Internet data service, such as a television data service or a telephone data service, is used by the computer 114, an additional security measure may be applied to the Internet data and or to the data of the additional data service used by the computer 114.

Figure 5:
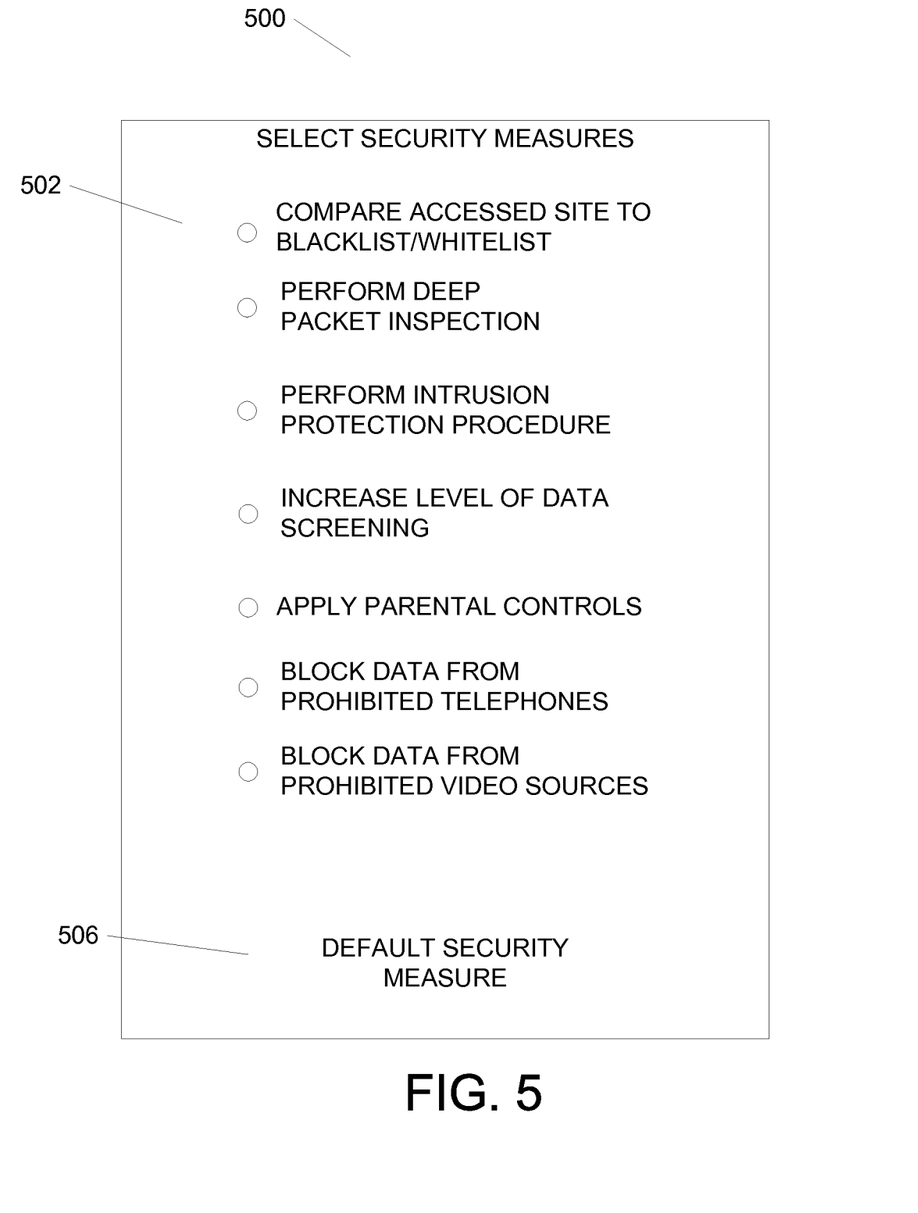
FIG. 5 depicts an interface to display a list of selectable security measures.

FIG. 5 depicts an interface 500 to display a list of selectable security measures. In one embodiment, the data service provider computing device 104 of FIG. 1 is adapted to display an interface such as the interface 500 to enable a system administrator to select one or more security measures to be applied to one or more data services provided by the data service provider. For example, a list of security measures 502 may be displayed, allowing the system administrator to select one or more of the listed security measures. The listed security measures 502 may include: comparing an accessed site to a black list or a white list, performing a deep packet inspection, performing an intrusion protection procedure, increasing a level of data screening, applying parental controls, blocking data from prohibited telephones, and blocking data from prohibited video sources. Also, a default set of security measures 506 may be displayed and applied.

In some embodiments, certain security measures may be applied to one data service but do not apply to another data service. For example, the application of deep packet inspection may be restricted to Internet data, whereas comparing an accessed site to a list of sites may apply to television data, telephone data, and Internet data. In some embodiments, security measures that may be applied are displayed in a hierarchy of measures for each type of data service: television, telephone, and Internet. For example, a first measure to be applied to Internet data may be anti-virus screening, whereas a second measure to be applied to Internet data may be deep packet inspection. As another example, a first measure to be applied to television data may be source discrimination, whereas a second measure to be applied to television data may be ratings discrimination. In another example, a first measure to be applied to telephone data may be anti-virus screening of Internet data received from a telephone network, whereas a second measure to be applied to telephone data may be source discrimination.

Figure 6:
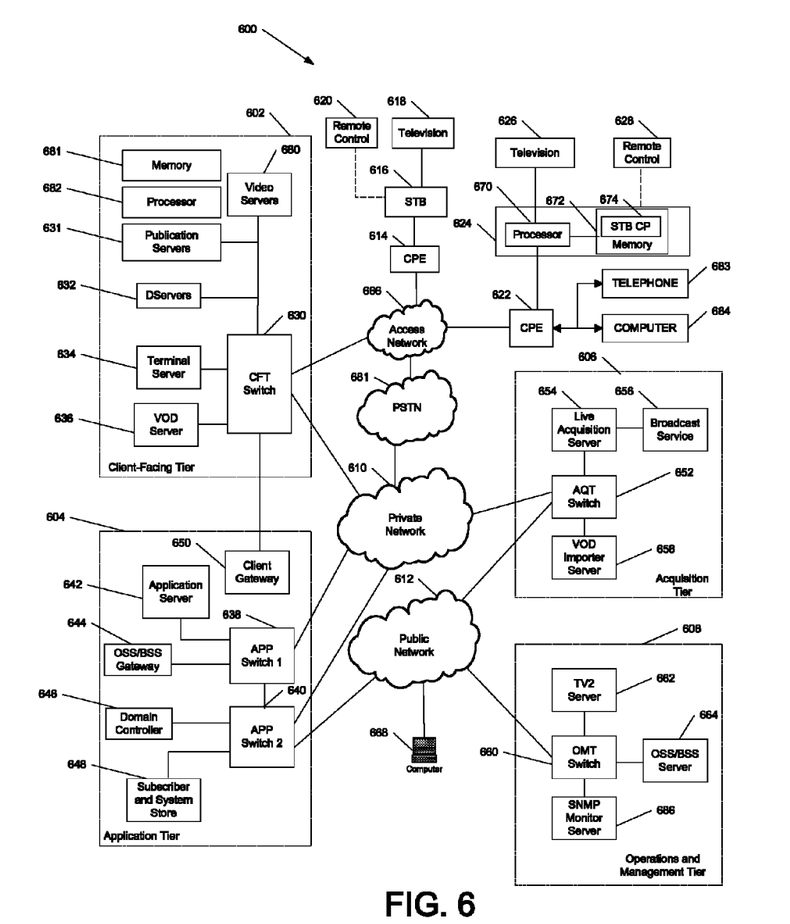
FIG. 6 is a block diagram of an illustrative embodiment of a system to distribute television data, telephone data, and Internet data.

FIG. 6 is a block diagram of an illustrative embodiment of a system 600 to distribute television data, telephone data, and Internet data. For example, the system 600 may be used to deliver television data, telephone data, and Internet data to the subscriber premises 102 of FIG. 1. As shown, the system 600 can include a client facing tier 602, an application tier 604, an acquisition tier 606, and an operations and management tier 608. Each tier 602, 604, 606, 608 is coupled to a private network 610; to a public network 612, such as the Internet; or to both the private network 610 and the public network 612. Further, each tier may be coupled to a Public Switched Telephone Network (PSTN) 681 directly or indirectly.

For example, the client-facing tier 602 can be coupled to the private network 610. Further, the application tier 604 can be coupled to the private network 610 and to the public network 612. The acquisition tier 606 can also be coupled to the private network 610 and to the public network 612. Additionally, the operations and management tier 608 can be coupled to the public network 612.

As illustrated in FIG. 6, the various tiers 602, 604, 606, 608 communicate with each other via the private network 610 and the public network 612. For instance, the client-facing tier 602 can communicate with the application tier 604 and the acquisition tier 606 via the private network 610. The application tier 604 can communicate with the acquisition tier 606 via the private network 610. Further, the application tier 604 can communicate with the acquisition tier 606 and the operations and management tier 608 via the public network 612. Moreover, the acquisition tier 606 can communicate with the operations and management tier 608 via the public network 612. In a particular embodiment, elements of the application tier 604, including, but not limited to, a client gateway 650, can communicate directly with the client-facing tier 602.

The client-facing tier 602 can communicate with user equipment via an access network 666, such as an Internet Protocol Television (IPTV) access network or other communications network. The access network 666 may be coupled indirectly or directly to the PSTN 681. As an example, the access network 666 may be the communications network 160 of FIG. 1. In an illustrative embodiment, customer premises equipment (CPE) 614, 622 can be coupled to a local switch, router, or other device of the access network 666. The client-facing tier 602 can communicate with a first representative set-top box device 616 at a first customer premises via the first CPE 614 and with a second representative set-top box device 624 at a second customer premises via the second CPE 622. The CPE 614, 622 can include routers, local area network devices, modems, such as digital subscriber line (DSL) modems, any other suitable devices for facilitating communication between a set-top box device and the access network 666, or any combination thereof. For example, CPE 614, 622 may include a residential gateway, such as the residential gateway 118 of FIG. 1. As an illustrative example, the first representative set-top box device 616 at the first customer premises may be the set top box device 112 of FIG. 1.

In a particular embodiment, the client-facing tier 602 can be coupled to the CPE 614, 622 via fiber optic cables. Alternatively, the CPE 614, 622 can be digital subscriber line (DSL) modems that are coupled to one or more network nodes via twisted pairs, and the client-facing tier 602 can be coupled to the network nodes via fiber-optic cables. Each set-top box device 616, 624 can process data received via the access network 666 via an IPTV software platform or other software platform.

The first set-top box device 616 can be coupled to a first external display device, such as a first television monitor 618, and the second set-top box device 624 can be coupled to a second external display device, such as a second television monitor 626. Moreover, the first set-top box device 616 can communicate with a first remote control 620, and the second set-top box device 624 can communicate with a second remote control 628.

In an exemplary, non-limiting embodiment, each CPE 614, 622 can receive television data, telephone data, and Internet data from the client-facing tier 602 via the access network 666 and may route the television data, the telephone data, and the Internet data to an end device, such as the televisions 618, 626, the telephone 683, or the computer 684. In an illustrative embodiment, the set-top box devices 616, 624 can include tuners that receive and decode television programming signals or packet streams for transmission to the televisions 618, 626. Further, the set-top box devices 616, 624 can include a STB processor 670 and a STB memory device 672 that is accessible to the STB processor 670. In one embodiment, a computer program, such as the STB computer program 674, can be embedded within the STB memory device 672. In another illustrative embodiment, a user computer 684, such as a personal computer, laptop or local server, can be coupled to a set-top box device, such as the second representative set-top box device 624, for example, via a universal serial bus (USB) connection or other connection.

In an illustrative embodiment, the client-facing tier 602 can include a client-facing tier (CFT) switch 630 that manages communication between the client-facing tier 602 and the access network 666 and between the client-facing tier 602 and the private network 610. As illustrated, the CFT switch 630 is coupled to one or more data servers, such as D-servers 632, that store, format, encode, replicate, or otherwise manipulate or prepare video content for communication from the client-facing tier 602 to the set-top box devices 616, 624. The CFT switch 630 can also be coupled to a terminal server 634 that provides terminal devices with a connection point to the private network 610. In a particular embodiment, the CFT switch 630 can be coupled to a video-on-demand (VOD) server 636 that stores or provides VOD content imported by the system 600.

Further, the CFT switch 630 is coupled to one or more video servers 680 that receive video content and transmit the content to the set-top boxes 616, 624 via the access network 666. In a particular embodiment, the CFT switch 630 can be coupled to one or more publication servers 631 that facilitate the formation of groups that share private content and the inclusion of indicators of such private content with video content received by users in a group.

In an illustrative embodiment, the client-facing tier 602 can communicate with a large number of CPEs, such as CPE 614 and CPE 622, over a wide geographic area, such as a regional area, a metropolitan area, a viewing area, a designated market area or any other suitable geographic area, market area, or subscriber or customer group that can be supported by networking the client-facing tier 602 to numerous set-top box devices. In a particular embodiment, the CFT switch 630, or any portion thereof, can include a multicast router or switch that feeds one or more video streams from a video server to multiple set-top box devices or to other consumer premises equipment.

As illustrated in FIG. 6, the application tier 604 can communicate with both the private network 610, the public network 612, and the PSTN 681. The application tier 604 can include a first application tier (APP) switch 638 and a second APP switch 640. In a particular embodiment, the first APP switch 638 can be coupled to the second APP switch 640. The first APP switch 638 can be coupled to an application server 642 and to an OSS/BSS gateway 644. In a particular embodiment, the application server 642 can provide applications to the CPEs 614, 622 via the access network 666, which enable the CPEs 614, 622 to provide functions, such as display, messaging, processing of IPTV data and Video On Demand (VOD) material, etc. In a particular embodiment, the OSS/BSS gateway 644 includes operation systems and support (OSS) data, as well as billing systems and support (BSS) data. In one embodiment, the OSS/BSS gateway 644 can provide or restrict access to an OSS/BSS server 664 that stores operations and billing systems data.

The second APP switch 640 can be coupled to a domain controller 646 that provides Internet access, for example, to users at their computers 668, 684 via the public network 612. For example, the domain controller 646 can provide remote Internet access to IPTV account information, e-mail, personalized Internet services, or other online services via the public network 612. In addition, the second APP switch 640 can be coupled to a subscriber and system store 648 that includes account information, such as account information that is associated with users who access the system 600 via the private network 610 or the public network 612. In an illustrative embodiment, the subscriber and system store 648 can store subscriber or customer data and create subscriber or customer profiles that are associated with IP addresses of corresponding set-top box devices 616, 624.

In a particular embodiment, the application tier 604 can include a client gateway 650 that communicates data directly to the client-facing tier 602. In this embodiment, the client gateway 650 can be coupled directly to the CFT switch 630. The client gateway 650 can provide user access to the private network 610 and the tiers coupled thereto. In an illustrative embodiment, the set-top box devices 616, 624 can access the system 600 via the access network 666, using information received from the client gateway 650. User devices can access the client gateway 650 via the access network 666, and the client gateway 650 can allow such devices to access the private network 610 once the devices are authenticated or verified. Similarly, the client gateway 650 can prevent unauthorized devices, such as hacker computers or stolen set-top box devices, from accessing the private network 610, by denying access to these devices beyond the access network 666.

For example, when the first representative set-top box device 616 accesses the client-facing tier 602 via the access network 666, the client gateway 650 can verify subscriber information by communicating with the subscriber and system store 648 via the private network 610. Further, the client gateway 650 can verify billing information and status by communicating with the OSS/BSS gateway 644 via the private network 610. In one embodiment, the OSS/BSS gateway 644 can transmit a query via the public network 612 to the OSS/BSS server 664. After the client gateway 650 confirms subscriber and/or billing information, the client gateway 650 can allow the set-top box device 616 to access IPTV content and VOD content at the client-facing tier 602. If the client gateway 650 cannot verify subscriber information for the set-top box device 616, e.g., because it is connected to an unauthorized twisted pair, the client gateway 650 can block transmissions to and from the set-top box device 616 beyond the access network 666.

As indicated in FIG. 6, the acquisition tier 606 includes an acquisition tier (AQT) switch 652 that communicates with the private network 610. The AQT switch 652 can also communicate with the operations and management tier 608 via the public network 612. In a particular embodiment, the AQT switch 652 can be coupled to a live acquisition server 654 that receives or acquires television content, movie content, advertisement content, other video content, voice, data, or any combination thereof, from a broadcast service 656, such as a satellite acquisition system or satellite head-end office. In a particular embodiment, the live acquisition server 654 can transmit content to the AQT switch 652, and the AQT switch 652 can transmit the content to the CFT switch 630 via the private network 610.

In an illustrative embodiment, content can be transmitted to the D-servers 632, where the content can be encoded, formatted, stored, replicated, or otherwise manipulated and prepared for communication from the video server(s) 680 to the set-top box devices 616, 624. The CFT switch 630 can receive content from the video server(s) 680 and communicate the content to the CPE 614, 622 via the access network 666. The set-top box devices 616, 624 can receive the content via the CPE 614, 622, and can transmit the content to the televisions 618, 626. In an illustrative embodiment, video or audio portions of the content can be streamed to the set-top box devices 616, 624.

Further, the AQT switch 652 can be coupled to a video-on-demand importer server 658 that receives and stores television or movie content received at the acquisition tier 606 and communicates the stored content to the VOD server 636 at the client-facing tier 602 via the private network 610. Additionally, at the acquisition tier 606, the video-on-demand (VOD) importer server 658 can receive content from one or more VOD sources outside the IPTV system 600, such as movie studios and programmers of non-live content. The VOD importer server 658 can transmit the VOD content to the AQT switch 652, and the AQT switch 652, in turn, can communicate the material to the CFT switch 630 via the private network 610. The VOD content can be stored at one or more servers, such as the VOD server 636.

When users issue requests for VOD content via the set-top box devices 616, 624, the requests can be transmitted over the access network 666 to the VOD server 636, via the CFT switch 630. Upon receiving such requests, the VOD server 636 can retrieve the requested VOD content and may transmit the content to the set-top box devices 616, 624 across the access network 666, via the CFT switch 630. The set-top box devices 616, 624 can transmit the VOD content to the television monitors 618, 626. In an illustrative embodiment, video or audio portions of VOD content can be streamed to the set-top box devices 616, 624.

FIG. 6 further illustrates that the operations and management tier 608 can include an operations and management tier (OMT) switch 660 that conducts communication between the operations and management tier 608 and the public network 612. In the embodiment illustrated by FIG. 6, the OMT switch 660 is coupled to a TV2 server 662. Additionally, the OMT switch 660 can be coupled to an OSS/BSS server 664 and to a simple network management protocol (SNMP) monitor 686 that monitors network devices within or coupled to the system 600. In a particular embodiment, the OMT switch 660 can communicate with the AQT switch 652 via the public network 612.

In operation, the set top box 616 may receive television data, telephone data, and Internet data from the access network 666. In one embodiment, the television data, the telephone data, and the Internet data may be separately and simultaneously monitored by the set top box 616. In another embodiment, the television data, telephone data, and Internet data are separately and simultaneously monitored by a processor 682 of the client-facing tier. The processor 682 monitors for usage or for problems according to computer instructions stored in a memory 681. The processor 682 may be the processor 106 of FIG. 1 and the memory 681 may be the memory 122 of FIG. 1. In an illustrative embodiment, the processor 682 executes computer instructions to apply one or more security measures to a data service, as described above, when more than one data service is used by a subscriber device, such as the subscriber set top box 624, the subscriber telephone 683, or the computer 684.

Figure 7:
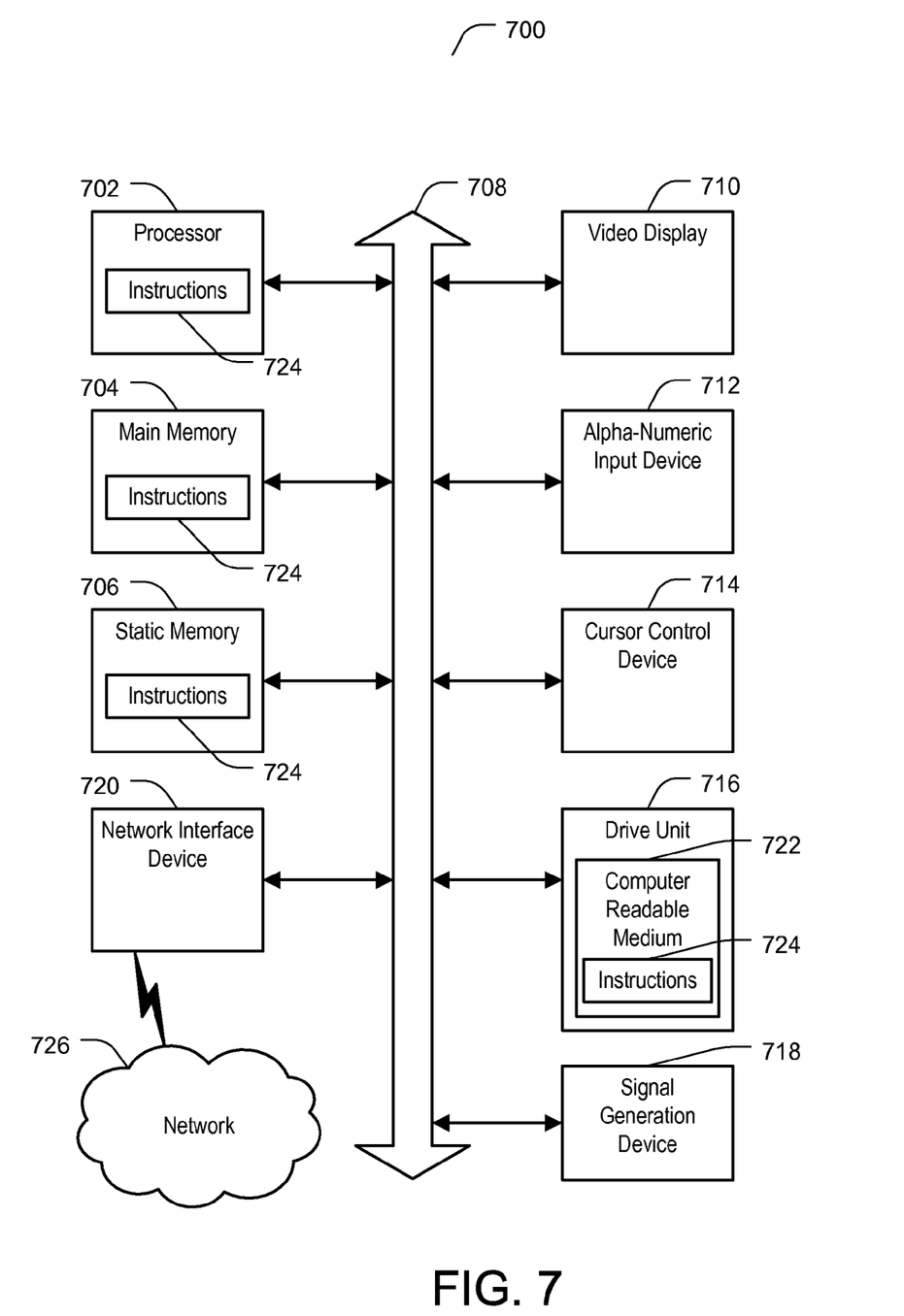
FIG. 7 is a block diagram of an illustrative embodiment of a general computer system.

FIG. 7 is a block diagram of an illustrative embodiment of a general computer system 700. The computer system 700 includes a set of instructions that can be executed to cause the computer system 700 to perform any one or more of the methods or computer based functions disclosed herein. The computer system 700, or any portion thereof, may operate as a standalone device or may be connected, e.g., using a network, to other computer systems or peripheral devices.

The computer system 700, or portions thereof, may be used with or to implement the data service provider computing device 104 of FIG. 1, the set top box devices 616, 624, the video server 680, the terminal server 634, the Video On Demand (VOD) server 636, the client gateway 650, the application server 642, the computer 668, or the computer 684 of FIG. 6.

The computer system 700 can also be implemented as or incorporated into various devices, such as a personal computer (PC), a tablet PC, a personal digital assistant (PDA), a mobile device, a palmtop computer, a laptop computer, a desktop computer, a communications device, a web appliance, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics-processing unit (GPU), or both. Moreover, the computer system 700 can include a main memory 704 and a static memory 706 that can communicate with each other via a bus 708. As shown, the computer system 700 may further include or be coupled to a video display unit 710, such as a liquid crystal display (LCD), an organic light emitting diode (OLED), a flat panel display, a solid-state display, or a projection display. Additionally, the computer system 700 may include an input device 712, such as a keyboard, a remote control device, and a cursor control device 714, such as a mouse. The computer system 700 can also include a disk drive unit 716, a signal generation device 718, such as a speaker or remote control device, and a network interface device 720. The network interface device 720 may be coupled to other devices (not shown) via a network 726.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

Dedicated hardware implementations, such as application specific integrated circuits, programmable logic arrays and other hardware devices, can be constructed to implement one or more of the methods described herein. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations can include distributed processing, component/object distributed processing, and parallel processing. Alternatively, virtual computer system processing can be constructed to implement one or more of the methods or functionality as described herein.

While the processor-readable medium is shown to be a single medium, the term "processor-readable medium" includes a single medium or multiple media that stores the instructions. The term "processor-readable medium" shall include any tangible medium that is capable of storing a set of instructions for execution by a processor or that cause a computer system to perform any one or more of the methods or operations disclosed herein.

In a particular non-limiting, exemplary embodiment, the processor-readable medium can include a solid-state memory such as a memory card or other package that houses one or more non-volatile read-only memories. Further, the processor-readable medium can be a random access memory or other volatile re-writable memory. Additionally, the processor-readable medium can include a magneto-optical or optical medium, such as a disk or tapes or other storage device. Accordingly, the disclosure is considered to include a processor-readable medium in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the scope of the claims. Thus, the claims shall not be restricted or limited by the foregoing detailed description.

What is claimed is:

1. A method comprising:
    accessing, at a computing device associated with a service provider, usage data associated with a first subscriber device and a second subscriber device;
    determining, at the computing device and based on the usage data, that the first subscriber device uses a first data service and a second data service and that the second subscriber device uses the first data service but not the second data service; and
    selectively applying, at the computing device, a security measure to the first data service for the first subscriber device but not for the second subscriber device in response to the determination, wherein selective application of the security measure is based on whether a particular subscriber device uses the second data service.

2. The method of claim 1, wherein the first subscriber device includes a set-top box, wherein the first data service includes a television data service, and wherein the second data service includes an internet data service.

3. The method of claim 1, wherein the first subscriber device includes a computer, wherein the first data service includes a television data service, and wherein the second data service includes an internet data service.

4. The method of claim 1, wherein the security measure includes screening of television data or comparing an accessed site to a list of prohibited sites.

5. The method of claim 1, wherein the security measure includes performing a deep packet inspection of a data packet sent to the first subscriber device or applying an intrusion detection procedure to the first data service.

6. The method of claim 1, further comprising selectively applying the security measure when data that is accessed by the first subscriber device includes content not controlled by the service provider.

7. The method of claim 1, further comprising:
- determining first usage data for the first subscriber device by monitoring usage of the first subscriber device, by receiving user input concerning usage of data services by the first subscriber device, or any combination thereof;
- updating the first usage data to establish second usage data; and
- modifying the security measure based on the second usage data.

8. The method of claim 1, wherein the first data service and the second data service are provided to a subscriber premises via a residential gateway, wherein the first subscriber device and the second subscriber device are associated with the subscriber premises.

9. The method of claim 8, wherein the residential gateway is configured to distribute the first data service to the first subscriber device and the second subscriber device and to distribute the second data service to the first subscriber device.

10. The method of claim 8, wherein the residential gateway comprises a modem.

11. The method of claim 1, wherein the first data service and the second data service are provided from the service provider to the first subscriber device via a set top box.

12. The method of claim 1, wherein the usage data indicates usage of the first data service, the second data service, or a combination thereof, and wherein the usage data is generated by a usage monitor configured to monitor usage of the first data service, the second data service, or a combination thereof.

13. A device comprising:
- a processor; and
- a memory to store usage data associated with a first subscriber device and a second subscriber device, wherein the memory further stores instructions that, when executed by the processor, cause the processor to perform operations including:
  - determining, based on the usage data, that the first subscriber device uses a first data service and a second data service and that the second subscriber device uses the first data service but not the second data service; and
  - selectively applying a security measure to the first data service for the first subscriber device but not for the second subscriber device in response to the determination, wherein selective application of the security measure is based on whether a particular subscriber device uses the second data service.

14. The device of claim 13, wherein the first data service includes a television data service, a telephone data service, an internet data service, or any combination thereof.

15. The device of claim 13, wherein selectively applying the security measure comprises applying the security measure to television data of a television data service when the usage data indicates that the television data service is used by a subscriber telephone, a subscriber computer, or both.

16. The device of claim 13, wherein selectively applying the security measure comprises applying the security measure to telephone data of a telephone data service when the usage data indicates that the telephone data service is used by a subscriber television, a subscriber computer, or both.

17. The device of claim 13, wherein selectively applying the security measure comprises applying the security measure to internet data of an internet data service when the usage data indicates that the internet data service is used by a subscriber television, a subscriber telephone, or both.

18. The device of claim 13, wherein the operations further include:
- generating a security profile for each device, the security profile including data associated with the security measure;
- storing, to the memory, the security profile; and
- presenting, via a display device, the security profile, wherein the security profile is presented as a ranked list.

19. A computer-readable storage device comprising instructions that, when executed by a processor of a data service provider computer, cause the processor to perform operations including:
- accessing usage data associated with a first subscriber device and a second subscriber device;
- determining, based on the usage data, that the first subscriber device uses a first data service and a second data service and that the second subscriber device uses the first data service but not the second data service; and
- selectively applying a security measure to the first data service for the first subscriber device but not for the second subscriber device in response to the determination, wherein selective application of the security measure is based on whether a particular subscriber device uses the second data service.

20. The computer-readable storage device of claim 19, wherein the operations further include applying a second security measure to the second data service for the first subscriber device in response to detecting that the first subscriber device uses the second data service.

21. The computer-readable storage device of claim 20, wherein the security measure is applied to internet data and the second security measure is applied to television data.

* * * * *